(12) United States Patent
Thirion et al.

(10) Patent No.: US 6,373,998 B2
(45) Date of Patent: Apr. 16, 2002

(54) IMAGE PROCESSING ELECTRONIC DEVICE FOR DETECTING DIMENSIONAL VARIATIONS

(75) Inventors: Jean-Philippe Thirion, Biot; Guillaume Calmon, Nanterre, both of (FR)

(73) Assignee: Inria Institut National DN Recherche en Informatique et en Automatique, Chesnay Cedex (FR)

(*) Notice: Subject to any disclaimer, the term of this patent is extended or adjusted under 35 U.S.C. 154(b) by 0 days.

(21) Appl. No.: 09/214,929
(22) PCT Filed: May 15, 1998
(86) PCT No.: PCT/FR99/00978
§ 371 Date: Jan. 15, 1999
§ 102(e) Date: Jan. 15, 1999
(87) PCT Pub. No.: WO98/53426
PCT Pub. Date: Nov. 26, 1998

(30) Foreign Application Priority Data

May 21, 1997 (FR) .............................. 97 06190

(51) Int. Cl.⁷ ................................................. G06K 9/32
(52) U.S. Cl. ....................... 382/294; 382/284; 382/282; 382/132; 128/922
(58) Field of Search ................................. 382/294, 128, 382/130, 131, 151, 132, 282, 284, 287; 250/455; 364/413.13; 128/922

(56) References Cited

U.S. PATENT DOCUMENTS 5,185,809 A * 2/1993 Kennedy et al. ................ 382/6
5,647,360 A * 7/1997 Bani-Hashemi et al. . 128/653.1
5,768,413 A * 6/1998 Levin et al. ................. 382/173
5,937,083 A * 8/1999 Ostuni ......................... 382/131
6,009,212 A * 12/1999 Miller et al. ................. 382/294
6,044,181 A * 3/2000 Szeliski et al. ............. 382/284

OTHER PUBLICATIONS

Ruzena Bajcsy et al., "Multiresolution Elastic Matching". *Computer Vision, Graphics and Image Processing.* Vol. 46, No. 1, Apr. 1989, pp. 1–21.

Mehran Moshfeghi, "Elastic Matching of Multimodality Medical Images". *CVGIP Graphical Models and Image Processing.* Vol. 53, No. 3, May 1991, pp. 271–282.

Cheng–Chung Liang et al. "Deformation Process Modeling In Medical Imaging". *Emergent Innovations On Information Transfer Processing and Decision Making.* Chicago, Oct. 18–21, 1992. Vol. 2 of 2, pp. 1358–1363.

* cited by examiner

*Primary Examiner*—Bhavesh Mehta
*Assistant Examiner*—Yosef Kassa
(74) *Attorney, Agent, or Firm*—Rabin & Berdo, P.C.

(57) ABSTRACT

A device includes a registration module that determines a registration transformation between a first set of data of a first image and a second set of data of a second image. A sampling module re-samples the first set of data into a third set of data able to be superposed directly, sample by sample, on the second set of data. A processing module determines, starting from the second and third set of data, a set of difference data representing differences between superposable areas of the images constituted by the second and third sets of data.

30 Claims, 4 Drawing Sheets

CENTRAL DEFORMATION WITH

CHANGE OF INTENSITY

FIG.3A  FIG.3B

DIFFUSE DEFORMATION WITHOUT

CHANGE OF INTENSITY

FIG.4A  FIG.4B

TRANSFORM- ATION WITH VARIATION

OF INTENSITY

IMAGE PROCESSING ELECTRONIC DEVICE FOR DETECTING DIMENSIONAL VARIATIONS

BACKGROUND OF THE INVENTION

The invention concerns the field of processing of comparable digital images, for the purpose of detecting (or determining) dimensional variations. They may be "two-dimensional" (2D) images, in which case the variation will be termed surface variation, or "three-dimensional" (3D) images, and in this case the variation will be termed volume variation.

The invention applies more particularly, but not exclusively, to images termed medical images, and especially to the analysis of comparable digital images of regions of the brain, in order to study areas of interest comprising, for example, lesions or tumours, or active anatomical structures such as the heart or the ventricles of the brain. By comparable images, there is meant images taken either of substantially identical regions of the same "subject" at different moments, or of substantially identical regions of two separate "subjects", or even of a single image and the associated image symmetrized with respect to a plane (or also termed "chiral"), when the region analyzed has a certain degree of symmetry.

In many fields it is very important to make comparative analyses of regions in order to see their evolution over time. This is especially the case in the field of high precision welding. But it is even more the case in the medical field, where the detection of lesions and/or following the course of their evolution is absolutely essential in order to adapt a treatment to a patient or to carry out clinical tests, for example. By evolution, there is meant any modification of a region, whether it is of the deformation type (mass effect) and/or of the transformation type (structural modification without deformation).

In the medical field, a set of image data forming an n-dimensional (nD) image is obtained by means of such apparatus as X-ray scanners or nuclear magnetic resonance apparatuses (MRI), or more generally any type of apparatus capable of acquiring images with variations in intensity. Each elementary part of a region represented by an nD image is defined by $n$ spatial co-ordinates and an intensity (measured magnitude).

Thus, in the case of an MRI, the 3D image of a region observed consists of a multiplicity of stacked 2D sections, in which the variations in intensity represent the proton density of the tissues.

Techniques are already known which make it possible to detect and/or estimate variations in volume in active regions:—S. A. Roll, A. C. F. Colchester, L. D. Griffin, P. E. Summers, F. Bello, B. Sharrack, and D. Leibfritz, "Volume estimation of synthetic multiple sclerosis lesions: An evaluation of methods", in the 3rd Annual Meeting of the Society of Magnetic Resonance, p. 120, Nice, France, August 1994; and C. Roszmanith, H. Handels, S. J. Pöppl, E. Rinast, and H. D. Weiss, "Characterization and classification of brain tumours in three-dimensional MR image sequences", in Visualization in Biomedical Computing, VBC'96, Hamburg, Germany, September 1996.

These techniques, termed "segmentation" techniques, consist in delineating (or attributing a contour to) an area of interest on two images of an active region, which are spaced in time, then subtracting the "volumes" contained within the two contours in order to estimate the variation in volume of the area of interest within the time interval separating the two images.

These techniques are particularly difficult to put into practice in the case of 3D images, owing to the difficulty encountered when delineating the area of interest. Moreover, the volume measurement is carried out by counting reference volume elements (voxels), of very small size, contained in a closed contour of an area of interest, the dimension of which is generally very large compared with that of a voxel. This counting can only be carried out by (semi-)automatic methods such as, for example, that termed "3D snakes", which are difficult to put into practice for the non-specialist such as is generally the practitioner who carries out the analysis of the images.

The result is that the uncertainty of the measurement of the volume of an area of interest is very often greater than the estimated variation in volume, which reduces the interest of such volume measurements to a considerable extent. The accuracy of these measurements is even poorer when man has to intervene, since the measurement is then dependent on the observer.

Moreover, the areas of interest are frequently difficult to detect, owing to the fact that the materials of which they consist are not always well contrasted in the images.

SUMMARY OF THE INVENTION

The aim of the present invention is therefore to improve the situation in this field of processing of digital images of active regions.

To this end, it proposes an electronic image processing device which comprises:

registration means making it possible to determine a registration transformation between one of the images and the other, starting from the two sets of image data, sampling means operating according to this registration in order to re-sample a first of the two sets of image data into a third set of image data relating to the same image, and able to be superposed directly, sample by sample, on the second set of image data, and processing means which operate starting from the second and third sets of image data in order to obtain therefrom at least one set of difference data, representing differences between superposable areas of interest of the images constituted respectively by the said second and third sets of image data.

Here, the expression "difference" should be taken in the wider sense, that is to say that it may be a question of the appearance of a new area of interest, or of a modification/transformation of a known area of interest. More generally, any type of difference between the two images is concerned here.

According to another feature of the invention, the processing means comprise a calculation module to determine firstly a deformation vector field, from the second and third sets of image data, in such a manner as to make it possible to provide the set of difference data.

Preferably, the processing means comprise first calculation means for applying to the deformation vector field at least a first operator so as to provide the set of difference data, which is then termed a first set of difference data.

The processing means may also comprise second calculation means for applying to the deformation vector field a second operator, different from the first operator, so as to provide another set of difference data, which is then termed a second set of difference data.

In this way, two sets of difference data are obtained which include complementary information on the areas of interest.

The processing means may additionally comprise third calculation means for applying to the deformation vector field a third operator, a composition of the first and second operators, so as to provide another set of difference data, which is then termed a third set of difference data. This makes it possible to obtain other information on the areas of interest, complementary to those obtained with a single operator, and moreover much less subject to noise interference, and consequently more precise, owing to the fact that the respective contributions of the "noise" generated by the application of these operators are decorrelated.

Consequently, the contrast of the areas of interest is significantly improved, which makes it possible to detect them more easily.

The first and second operators are advantageously selected from a group comprising an operator of the modulus type and an operator based on partial derivatives, of the divergence or Jacobian type, for example.

The modulus type operator will provide information more particularly representing movements, while the operator based on partial derivatives will provide information representing more particularly growth or diminution (volume variation or mass effect).

According to yet another feature of the invention, the processing means may comprise detection means in order to transform each first, second and third set of difference data into a fourth set of image data forming a card.

Depending on the variants, the detection means will be arranged either to allow manual selection by a user, from one of the cards, of the areas of interest, or to carry out automatic selection of the areas of interest in one of the cards.

In the case of automatic selection, it is of advantage that this selection is effected by analysis of the connex elements type.

Advantageously, the detection means are capable of determining the closed contours which respectively delimit selected parts of the areas of interest. This determination may be effected by approximation by spheres or by ellipsoids.

According to yet another feature of the invention, the processing means may comprise, separately, or in parallel with the detection means, quantification means for determining, from the deformation vector field and the second and third sets of image data, volume data representing differences of the volume variation type, so as to form the set of difference data, which is then termed a set of volume data.

This determination of the volume variations in an area of interest preferably comprises:
  the association with a closed contour, representing the area of interest, of a reference contour encompassing this closed contour; the reference contour may be substantially identical to the shape of the area of interest, or may be spherical, or even ellipsoidal,
  the breaking down into elements, by means of a points distribution, of the space contained in the reference contour; this breaking down of the space may be effected by means of a regular points distribution, forming a lattice, or stochastically by means of a random points distribution,
  the counting of the elements contained within the closed contour of the area of interest,
  the application to this points distribution of the deformation vector field, without deforming the closed contour of the area of interest,
  the counting of the remaining elements within the closed contour of the area of interest, and
  the subtraction of the two numbers of elements so as to determine the image data of the set of volume data representing volume variations of the area of interest.

Preferably, the quantification means calculate, in each area of interest, a multiplicity of volume variations of the selected area of interest, for reference contours which are closed and nested in one another, and comprised between the contour comparable with a point of zero dimension and the reference contour, then determine from this multiplicity of volume variations that which is the most probable. This makes it possible to improve further the accuracy of the volume variation calculation.

When the processing means comprise both quantification means and detection means, it is particularly advantageous that the quantification means operate on closed contours determined by the detection means in the areas of interest selected by the latter. This makes it possible to reduce the processing time very significantly, without thereby reducing the quality and accuracy of the results obtained, since it is not necessary to carry out quantification everywhere in the image.

Moreover, when the device does not comprise detection means, segmentation means can be provided which are intended to supply the quantification module with the areas of interest, from the second set of image data.

The invention applies more particularly to medical digital images, and most particularly to three-dimensional medical images of regions of a living being (animal or human), which regions comprise areas of interest including lesions or tumours, active or not, or active anatomical structures such as the heart or the ventricles of the brain. The second image may be deduced from the first image by a symmetry with respect to a plane.

The invention also proposes a method for processing comparable digital images, which comprises the following steps
  determining a registration transformation between one of the images and the other, starting from the two sets of image data,
  re-sampling a first of the two sets of image data, representing the registration image, into a third set of image data relating to the same image and able to be superposed directly, sample by sample, on the second set of image data,
  determining, from the second and third sets of image data, at least one set of difference data representing differences between superposable areas of the images constituted, respectively, by the said second and third sets of image data.

BRIEF DESCRIPTION OF THE DRAWINGS

Other features and advantages of the invention will be revealed on examination of the detailed description which follows, and of the appended drawings, in which.

The drawings are essentially of a definite nature. Consequently they form an integral part of the present description. They may therefore serve not only to allow better understanding of the invention, but also to contribute to the definition of the latter.

Reference will be made hereinafter to the processing of medical digital images, and more particularly, but only by way of example, to images of regions of the brain of the type which are illustrated partially in FIGS. 1A and 1B and which have been obtained from the same human subject at an interval of approximately two months.

Figure 1A:
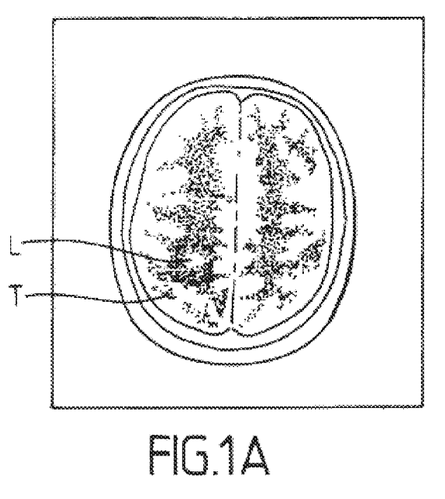
FIGS. 1A and 1B are two views in section of the same region of a human brain affected by an active lesion, which are obtained at different times.
Figure 1B:
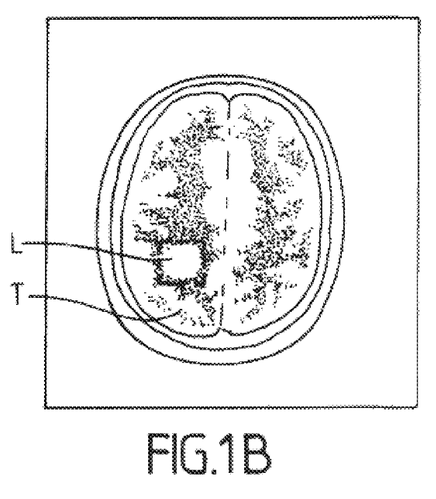
Figure 2A:
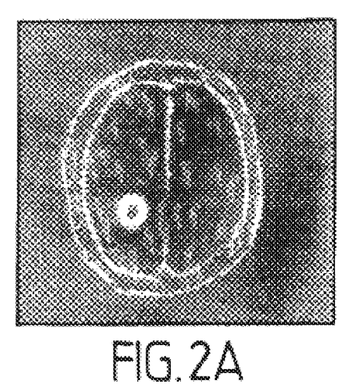
FIGS. 2A to 2D are processed images representing an area of interest in FIG. 1A, based on its position in this image 1A, after subtraction of the images 1A and 1B, after application to the deformation vector field of a first operator of the modulus type, after application to the deformation vector field of a second operator of the divergence type, and after application to the deformation vector field of a third operator produced from the first and second operators.
Figure 2B:
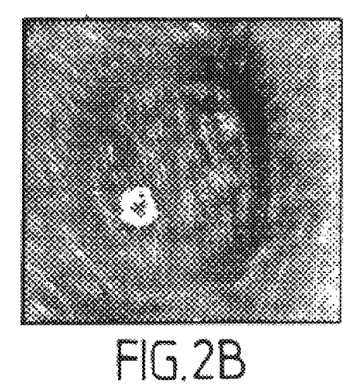
Figure 2C:
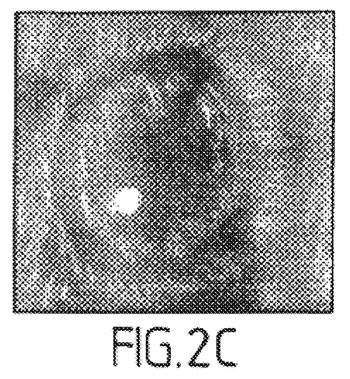
Figure 2D:
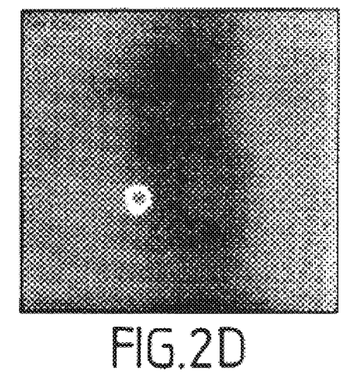

The image of FIG. 1B will be called the first image, and the image of FIG. 1A the second image. In these two images there is framed by dash/dotted lines an area termed area of interest, containing an active lesion induced by a disease of the plaque sclerosis type.

FIGS. 1A and 1B in fact represent a two-dimensional (2D) part of a three-dimensional (3D) image of a region of the brain, the other parts forming with the 2D part illustrated a stack of 2D image sections. Such sections may be obtained, in particularly, by magnetic resonance imaging (MRI). Each image tranche in fact constitutes an intensity card representing the proton density of the constituents of the region, here the tissues and lesions.

A three-dimensional image is consequently constituted by a set of digital image data, each image datum representing the position of an image voxel with respect to a three-dimensional point of reference, and the intensity of the voxel, which is generally between the values 0 and 1. In fact, to be more precise, the image data form an ordered list (or table), and the position of the datum in this list implicitly provides the position co-ordinates.

The device according to the invention is suitable for processing such sets of image data representing, respectively, comparable digital images. By comparable, there is meant here images of the same region taken at different times, But, in other image processing applications, it could be a question of images of identical regions of different patients, or of different subjects, or even of a first image of a region exhibiting a certain degree of symmetry and of a second "symmetrized" (or chiral) image.

The principal object of the device according to the invention is to process two sets of image data representing two digital images, at least one of which contains at least one area of interest including at least one active structure, in such a manner as to quantify the differences which might exist between the two images.

Figure 3A:
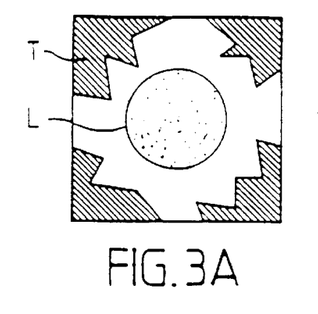
FIGS. 3A and 3B illustrate diagrammatically an area of interest before and after evolution of the central deformation type with change of intensity.
Figure 3B:
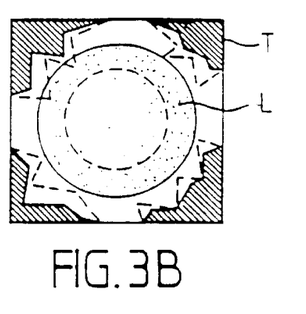
Figure 4A:
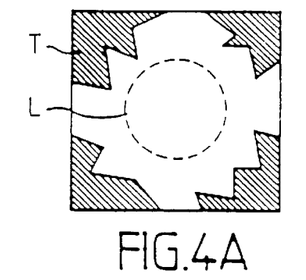
FIGS. 4A and 4B illustrate diagrammatically an area of interest before and after evolution of the diffuse deformation type without change of intensity.
Figure 4B:
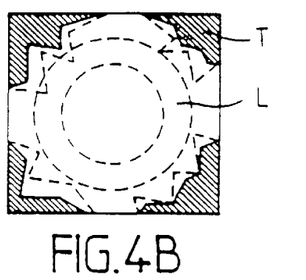
Figure 5A:
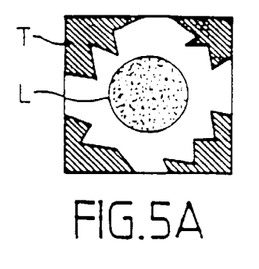
FIGS. 5A and 5B illustrate diagrammatically an area of interest before and after evolution of the transformation type without displacement, but with variation of intensity.
Figure 5B:
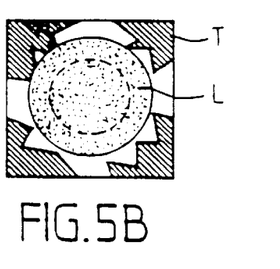

As is illustrated diagrammatically in FIGS. 3 to 5, the modifications which may appear in an "active" area may be of several types. It may be a question (see FIGS. 3A and 3B) of a modification of the central deformation type with change of intensity. In this case, the area of interest comprises healthy tissues T in the centre of which there is a lesion L, the volume of which increases, or decreases, in the course of time, thus causing displacement of the tissues. The modification may also be of the diffuse deformation type without change of intensity. In this case, as illustrated in FIGS. 4A and 4B, the lesion L which is located in the centre of healthy tissues T is not visible, and only displacements of the tissues which surround it reveal its presence. The modification may also be of the transformation type without displacement, but with change of intensity, as is illustrated in FIGS. 5A and 5B. In this case, the lesion, visible or not, which is located at the centre of the healthy tissues T increases or decreases without causing displacement of the said healthy tissues. Combinations of these different types of modifications may of course also occur.

The device according to the invention comprises, for the purpose of processing the first and second sets of image data, a certain number of modules which co-operate with one another.

A registration module 10 is charged with receiving the first and second sets of image data in order to determine a registration transformation termed "rigid" $T_R$ between the first and second images. The rigid registration is described in particular in U.S. patent application Ser. No. 92 03900 of the Applicant, and also in the publication "New feature points based on geometric invariance for 3D image registration", in the International Journal of Computer Vision, 18 (2), pp. 121–137, May 1996, by J-P. Thirion.

Figure 6:
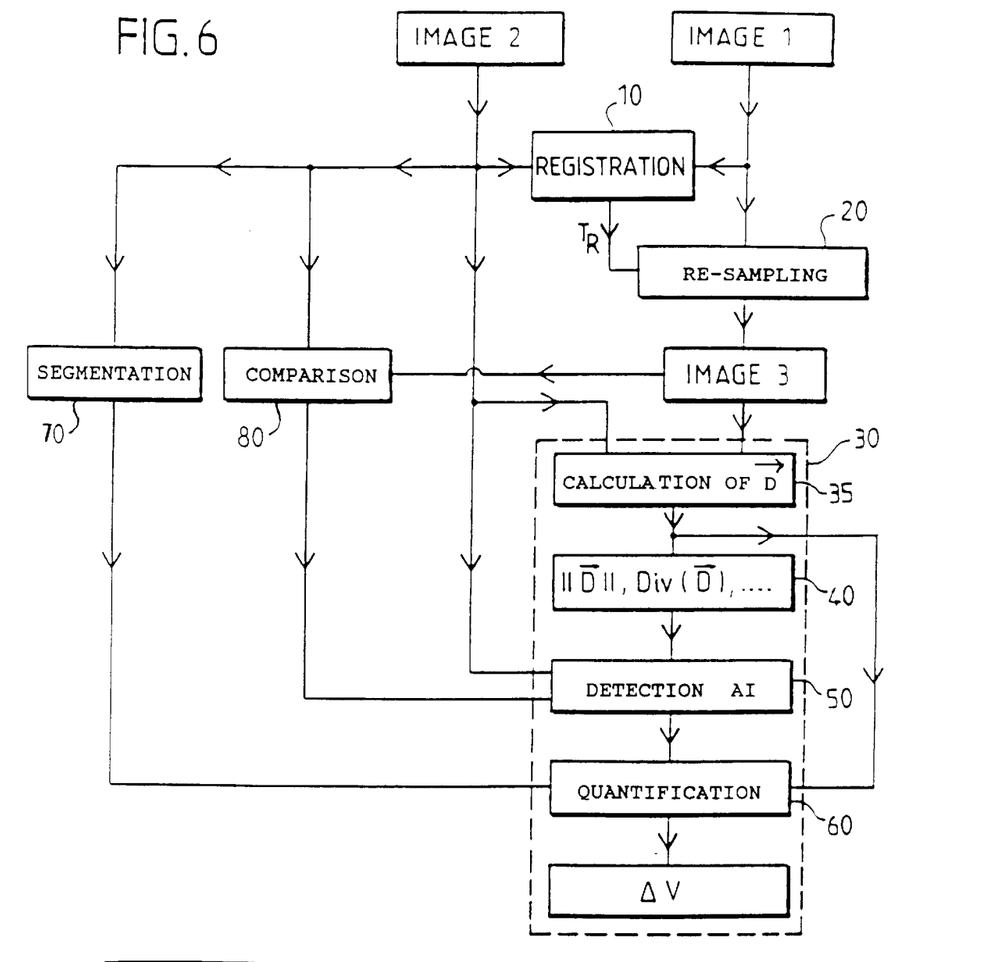
FIG. 6 is a flow chart illustrating the general operation of the device.

This rigid registration operation makes it possible to obtain a first superposition of the two initial images having a n accuracy which may reach a tenth of an image volume element (or voxel). In the example illustrated in FIG. 6, the registration transformation $T_R$ makes it possible to p ass from the image 1 in FIG. 1B to the image 2 in FIG. 1A (which here serves as a reference image).

The registration transformation applied to the image 1 then feeds a sampling module 20 intended to re-sample the image 1 processed by the registration transformation $T_R$ so as to form a third set of image data representing a third image able to be precisely superposed, sample by sample, on the second image (reference image). Obviously, this superposition is effective everywhere except in the areas which have undergone evolution (or transformation) from one image to the other (that is to say, here, the areas of interest comprising lesions).

The second and third sets of image data representing, respectively, the second image and the first image which has been processed by registration and re-sampling (or third image), are addressed to a processing module 30, and more precisely to a deformation field calculation module 35 which the said processing module 30 comprises. There is firstly applied to them a deformation processing termed "non-rigid", which is d described in particular in the publication "Non rigid machine using demons", in Computer Vision and Pattern Recognition, CVPR'96, San Francisco, Calif., USA, June 1996, by J-P. Thirion.

Figure 10:
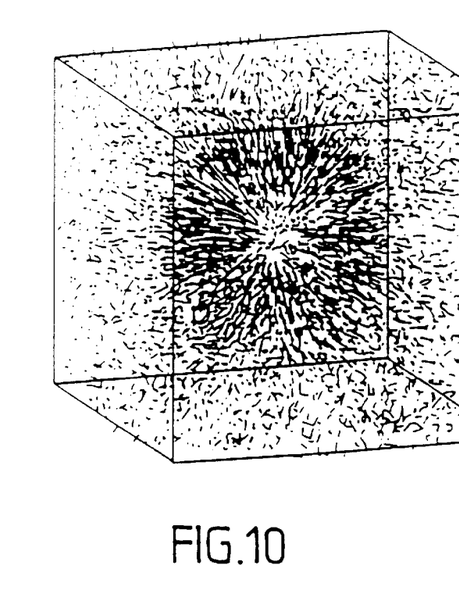
FIG. 10 illustrates a three-dimensional (3D) example of deformation vector field.

This technique resembles the technique of optical flow, when the deformations considered are very small. It makes it possible to determine a deformation vector field $\vec{D}$ representing the displacement vector distribution (3D), during the passage from the second image to the third image (transform of the first image), based on each image element or voxel of the second image. An example of a deformation vector field $\vec{D}$ is illustrated in FIG. 10.

The deformation vector field $\vec{D}$ therefore indicates, by means of a vector for each image voxel, the direction, and the direction of displacement, of the voxel, and also the variation in intensity undergone by this voxel associated with the said vector, when considering its passage from the image 3 (transform of the image 1) to the image 2 (reference image), based on that same image 2.

The deformation vector field $\vec{D}$ determined by the module 35 is used by a quantification module 60 intended to determine the volume variations of the areas of interest of the images, and preferably integrated with the processing module 30. The processing which it carries out in order to do this will be explained with more particular reference to FIG. 8.

Figure 8:
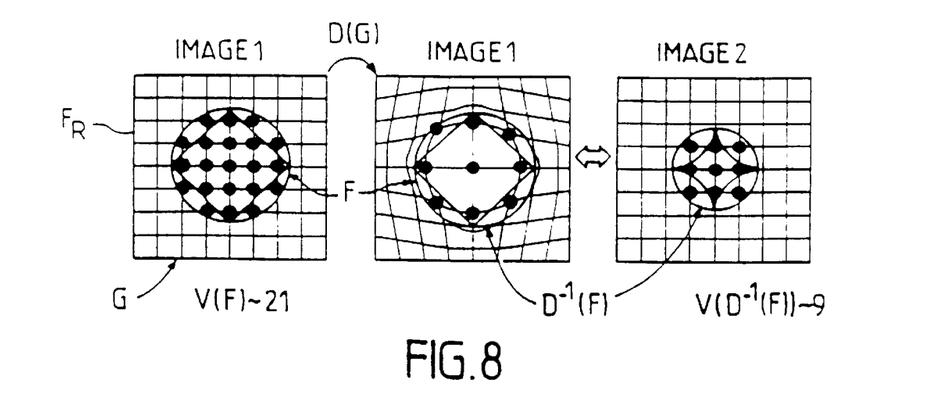
FIG. 8 illustrates a graphic example of calculation of volume variation in the case of a points distribution of the network type.

The quantification carried out by the quantification module 60 consists firstly of encompassing the active lesion, contained in an area of interest, within a reference shape $F_R$ delimited by a reference contour which may either be of a shape similar to that F of the active lesion delimited by a closed contour (the calculation of which will be described in detail hereinafter), which may take any type of shape, such as, for example, a shape similar to that of the active lesion, or ellipsoidal, or even of spherical or cubic shape (as illustrated in FIG. 8).

The closed contour as well as the reference contour are topologically closed and orientated surfaces, or in other words having an interior in the mathematical sense of the term (the shape F of the active lesion) and an exterior. Moreover, the deformation vector field $\vec{D}$ is assumed to be continuous and bijective. In the following, for reasons of convenience, the term $D_{2,1}$ will be given to the deformation vector field $\vec{D}$ making it possible to pass from image 2 to image 1 (by way of its transform (image 3)).

$F_1$ and $F_2$ are the respective shapes of the active lesions in the first and second images. $F_1$ and $F_2$ belong to the same space E as $D_{2,1}$. There is therefore the following relationship: $F_1 = D_{2,1}(F_2)$, which means that the shape $F_1$ of the active lesion of the first image is equal to the transform by the deformation vector field $D_{2,1}$ of the shape $F_2$ of the same active lesion of the second image (reference image).

The reference shape $F_R$ which is determined by the quantification module 60 is selected such that $F_1 \subset F_R$ and $F_2 \subset F_R$. The volume $V_R$ of the reference shape $F_R$ is known, since it has been attributed by the quantification module 60.

In order to determine the volume variation $\Delta V$ between the shapes $F_2$ and $F_1$, it is necessary to determine the respective volumes $V_1$ and $V_2$ of the active lesions of the shape $F_1$ and $F_2$.

The volume $V_2$ may advantageously be evaluated by a stochastic method of the Monte Carlo type, which consists in taking $N_R$ points randomly within the shape $F_R$, for a constant distribution density.

Then $N_2$, which is the number of points falling within the shape $F_2$, is measured, and the relationship:

$$V_2 = V(F_2) \simeq (N_2/N_R) \times V_R$$

is obtained.

Here, the sign "$\simeq$" means that $(N_2/N_R) \times V_R$ tends towards $V_2$ when $N_R$ tends towards infinity.

Similarly, the number of points $N_1$ which fall within the shape $F_1$ are measured, and:

$$V_1 = V(F_1) \simeq (N_1/N_R) \times V_R$$

is obtained.

Therefore, taking a point P belonging to the reference shape $F_R$, this point P belongs to the first shape $F_1$ if, and only if, the transform of the said point P by the deformation vector field $D_{1,2}$ (equal to $D^{-1}_{2,1}$) belongs to the transform by the same deformation vector field $\vec{D}_{1,2}$ of the first shape $F_1$, which is equal to the second shape $F_2$. The relationship:

$$P \in F_1 \Leftrightarrow D_{1,2}(P) \in D_{1,2}(F_1) = F_2$$

is obtained.

This relationship is made possible by the fact that the deformation vector field $D_{2,1}$ is continuous and bijective or, in other words, that: $D_{1,2}$ is equal to $D^{-1}_{2,1}$.

Consequently, the number $N_1$ of points which fall within the shape $F_1$ is equal to the number of points taken randomly within the reference shape $F_R$ verifying the relationship $$D_{1,2}(P) \in F_2.$$

The Applicant observed that it was more advantageous to use the latter property to evaluate $N_1$, since it is sufficient to determine a single shape $F_2$, and not two shapes $F_1$ and $F_2$.

There is then deduced therefrom the volume variation $\Delta V$ of the active lesion observed on the first (third) and second images:

$$\Delta V = V_1 - V_2 = (N_1 - N_2) \times V_R / N_R$$

In the above formula, it is possible to replace the ratio $V_R/N_R$ by the constant distribution density $\underline{d}$ of points contained in $F_R$, which is substantially equivalent to the said ratio $V_R/N_R$.

As is illustrated in FIG. 8, instead of a random (or stochastic) points distribution, it is possible to take a regular distribution forming a grid G defined in the space E. It is not of course obligatory for the elementary mesh of the grid G to be of the cubic type as illustrated in FIG. 8. Any type of lattice (network) may be envisaged.

For a regular lattice, the value of the volume variation $\Delta V$ tends towards the true value when the resolution of the grid (the volume of its mesh) tends towards the value 0.

In practice, the deformation field $D_{1,2}$ is not always continuous, but its representation may be discretized ($D^-_{1,2}$). In such a case, only those co-ordinates of the volume elements which correspond to points of a regular grid G, that is to say, the points $D^-_{1,2}(G)$, are available.

Under these conditions:

$V_R \simeq$ the number of points of the regular grid G which fall within the reference shape $F_R$, multiplied by the volume of the mesh;

$V_2 \simeq$ the number of points of the regular grid G which fall within the second shape $F_2$, multiplied by the volume of the mesh; and $V_1 \simeq$ the number of points of $D^-_{1,2}(G)$ which fall within the second shape $F_2$, multiplied by the volume of the lattice mesh.

In the case of a discretized representation $D^-_{1,2}(G)$ of the deformation field, it is also possible to use a stochastic distribution of points $P_i$, the co-ordinates of which are floating in the space E. It is then sufficient, in order to evaluate $D_{1,2}(P_i)$, to use the discretized field $D^-_{1,2}$ and an n-linear type interpolation of the discrete field, within the mesh G in which the point $P_i$ falls. In this mesh $\underline{i}$, the point $P_i$ has co-ordinates $\alpha_i$, $\beta_i$ and $\gamma_i$, all between 0 and 1 (inclusive values). The interpolation will be 2-linear in the case of a 2D image and 3-linear in the case of a 3D image.

To sum up, quantification consists in carrying out the following steps (see FIG. 8):

firstly, associating with a closed contour, representing an active lesion of an area of interest, a reference contour $F_R$ (square in the example in FIG. 8) which encompasses the closed contour F, then, by means of a points distribution which may be stochastic or regular, breaking down into simple elements (for example into meshes) the space contained in the reference contour $F_R$;

then counting the meshes (or elements, or mesh nodes) which are contained within the closed contour F of the area of interest;

then, applying to the points distribution (here the cubic mesh grid) the deformation vector field $D_{1,2}$ without deforming the closed contour F;

then counting the meshes (or elements, or nodes) remaining within the closed contour F;

then carrying out the subtraction between the two numbers of meshes (or elements, or nodes) thus determined so as to determine the volume variation of the active lesion of the area of interest analyzed.

In the example illustrated in FIG. 8, the number of cubic mesh nodes comprised within the sphere F forming the closed contour is equal to approximately 21 before the application of the deformation field $\vec{D}$, and this number of nodes is equal to no more than approximately 9 after the application of the same deformation field $\vec{D}$.

The volume variations thus determined form a set of difference data, in which the differences are volume variations; the set is then termed a "set of volume data". This set may be put into the form of a set of image data with a view to displaying it on an intensity card, for example, based on the second image; the intensity differences represent the volume variation amplitudes.

Figure 9:
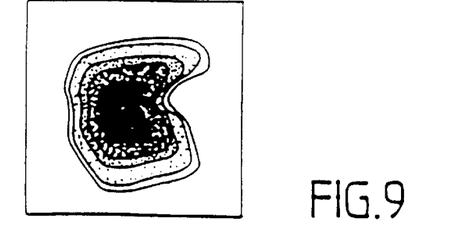
FIG. 9 illustrates a two-dimensional (2D) example of a family of closed and nested forms.

According to the invention, it is possible to improve the calculation of the volume variation of an area of interest. In order to do this, the quantification module 60 may be arranged to calculate volume variations Δi for a whole family of closed and nested shapes i comprised between a zero volume (comparable to a geometric point) and the volume $V_R$ of the reference shape $F_R$ which encompasses a closed contour of an area of interest (see FIG. 9). For each shape of the family the number of meshes (or elements) which fall between two successive surfaces i and i+1, which delimit a "shell", is counted. Then, the contributions of the shells are summated as follows:

$$N_G^i = \Sigma_1^i C_G^i$$

$$N_G^{i+1} = N_G^i + C_G^{i+1}$$

Starting from a shape F, it is possible to calculate a distance card, for example by means of the chamfer method, or by Gaussian smoothing, and the n define a set of closed and nested shapes in the form of iso-surfaces defined from the distance card.

Figure 11:
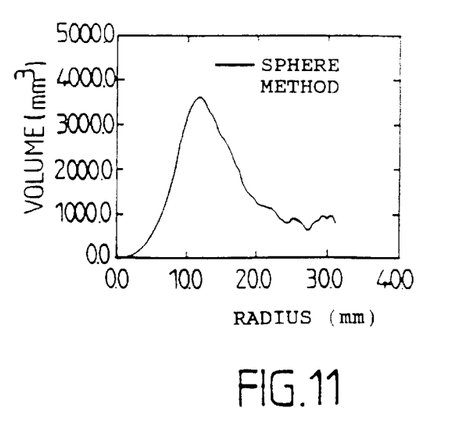
FIG. 11 is a diagram representing the estimation of the volume variation of a lesion according to the radius of a reference sphere which encompasses it.

This provides a volume variation curve of the type represented in FIG. 11. The maximum of this curve provides the most probable value of the volume variation of the active lesion analyzed. This makes it possible to improve the accuracy and strength of this measurement of volume variation.

In the preceding description, a volume variation calculation was made starting, in particular from the closed contour of a lesion. This closed lesion co tour may be determined in three ways: by a manual or automatic segmentation module 70, or directly by the quantification module 60, or by a detection module 50 from difference data provided by a calculation module 40.

The segmentation methods are well known to a person skilled in the art. An example of such a method is described, for example, in the publication by Isaac COHEN, Laurent COHEN, and Nicholas AYACHE, "using deformable surfaces to segment 3D images and infer differential structures", in CVGIP:

Image understanding '92, September 1992. This methods consists in determining areas of interest directly from the second image. In the diagram illustrated in FIG. 6, when a detection module 50 is not use id, the quantification module 60 is fed by the module for calculating the deformation field 35 and by the segmentation module 70 which provides the areas of interest in which Quantification is to be carried out. The segmentation module 70 may be integrated in the processing module 30.

The calculation module 40 is in-ended to transform the deformation vector field $\vec{D}$, provided by the module for determining the deformation field 35, into at least one set of difference data, preferably by the application of at least a first operator.

Preferably, but this is in no way obligatory, the calculation module 40 applies two operators, in parallel, to the deformation vector field $\vec{D}$ in order to determine a first and a second set of difference data. Preferably, the first and second operators are selected from a group comprising a modulus type operator and an operator based on partial derivatives. Thus, the first operator may be of the modulus type ($\|\|$) while the second operator is based on partial derivatives.

The modulus operator consists in transforming the vectors representing the field $\vec{D}$ into intensities $\|\vec{D}\|$ based on the second image, so as to form a first set of difference data which can then be transformed into a first "fourth" set of image data, forming an intensity card representing modifications of the tissue displacement type.

DETAILED DESCRIPTION OF PREFERRED EMBODIMENTS

The operator based on partial derivatives is preferably of the divergence type (Div), but it may also be of the Jacobian type. The application of such an operator to the deformation vector field $\vec{D}$ makes it possible to transform the vectors representing the field $\vec{D}$ into intensities Div $\vec{D}$ based on the second image, so as to form a second set of difference data which can then be transformed into a second "fourth" set of image data, forming g another intensity card representing modifications of the volume variation type. When the second operator is of the divergence type, the sign of the divergence of the field $\vec{D}$ (Div $\vec{D}$) at a given point makes it possible to indicate whether the lesion is in a growth phase or in a diminution phase.

The Applicant also observed, in particular in the characterization of the lesions induced by plaque sclerosis, that is was advantageous to apply to $\vec{D}$ a third operator, a composition of the first and second operators. In other words, it is of particular interest that the calculation module 40 of the processing module 30 effects the product of the modulus of the deformation vector field $\vec{D}$ and of the divergence of that same vector field $\vec{D}$, that is to say, $\|\vec{D}\|*$ (Div $\vec{D}$). The result of the application of this third operator provides a third set of difference data which can then be transformed into a third "fourth" set of image data, forming yet another intensity car representing, for each voxel based on the second image, both displacement areas and volume variation areas, representing volume variations.

Moreover, since the respective digital noises of the first and second sets of difference data, obtained by application of the first and second operators, are generally decorrelated, the composition of their difference data makes it possible to eliminate the noise almost completely. This makes it possible to improve very significantly the contrast of the intensity card, compared with that obtained by application either of the first operator alone, or of the second operator alone.

The device according to the invention may also comprise a comparison module 80, dependent or not dependent on the processing module 30, to provide another set of difference data from the subtraction of the second and third sets of image data. This other set may also give an intensity card representing differences, in the first sense of the word, between the images 2 and 3.

FIGS. 2A to 2D show, by way of comparison, the different intensity image cards obtained by direct subtraction of the second and third sets of image data, after application to the field $\vec{D}$ of a first operator of the modulus type, after application to the deformation -vector field of a second operator of the divergence type, and after application to that same field $\vec{D}$ of a third operator produced from the first and second operators.

These four intensity image cards obtained from fourth sets of different image data make it possible to obtain substantially complementary information, and consequently to display and/or characterize better the areas of interest including active lesions or not.

It is clear that the object of he transformations of the field $\vec{D}$ into a sea of difference data, then into a fourth set of image data is to allow the display, on a video screen, or a work station terminal, differences (in the wider sense of the word) between the images (also called areas of interest), when the device according to the invention is incorporated therein . This incorporation may take place, for example, in the mass memory managed by the operating system of the work station which is operated by a technician or a practitioner.

Starting from at least one of the fourth sets of image data, or more directly from the corresponding set of difference data, the device will make it possible to determine the closed contours of the lesions contained in the areas of interest.

Detection may be either automatic or manual (intervention of a technician or the practitioner having Interest in the images). It is clear that in the manual case, detection/selection can be carried out only from the display of an intensity card (fourth set of image data). In either case, detection is made possible by a module for detecting areas of interest 50 which forms part of the processing module 30.

When it is the technician who selects the areas of interest manually, a user interface may b provided, such as, for example, a mouse, in order to make it easier to select from images of the treated deformation vector field $\vec{D}$ and from the second and third images. The device according to the invention, and more particularly its detection module 50 is then capable of determining the closed contour of the lesion contained in the selected area or areas of interest. Depending on the variants, the shape of the closed contour is either similar to that of the active lesion within the area of interest, or ellipsoidal, or even spherical.

It is clear that, in the case of three-dimensional images, even if the selection of an area of interest is carried out on one of the two-dimensional images of the three-dimensional dimensional region analyzed, the detection module 50 is arranged to search among the nearby two-dimensional images of the three-dimensional stack, forming the 3D image, the parts comprising the active lesion.

In the case of automatic selection, it is the detection module 50 which determines the different areas of interest and which consequently, determines a closed contour for each active lesion that they respectively contain, just as in the manual procedure.

Preferably, this automatic detection of the areas of interest is carried out by means of a technique termed "by connex elements" (or connex parts search), which is well known to a person skilled in the e rt.

More precisely (see FIG. 7), the selection/determination of the areas of interest comprise, first of all the production of a mask 51 from the second image (reference image), and the combination of this mask, by a logic operation of the "ET" type 52 with one of the sets of difference data resulting from the application to the deformation vector field $\vec{D}$ of at Least one of the operators. The result of this logic operation between a set of difference data (or the associated fourth set of image data) and the mask of the second image provides a "masked" image which makes it possible to locate in the mask of the second image, the areas of difference determined by the application of the operator or operators to the deformation field. It is therefore a question of a procedure tending to allow the location of the different areas of difference (or areas of interest) relative to the second image. In the case of images of the brain, and more particularly of plaque sclerosis, the mask may correspond, for example, to the white matter of the brain.

Figure 7:
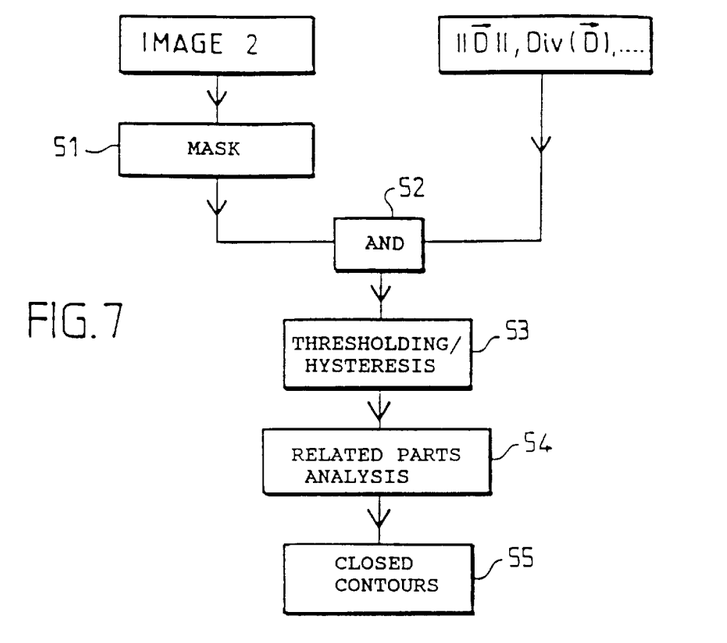
FIG. 7 is a flow chart illustrating the operation of the detection module of the device.

The data constituting this masked image are then subjected to processing 53 termed thresholding by hysteresis, making it possible to retain in the mailed image all the related components above a first selected minimum threshold and containing at least one point of intensity above a second threshold, higher than the first threshold. This allows the electronic noise of this masked image to be reduced.

Once the masked image is "de-noised", a search is made for the related parts which it contains 54, so as to determine the shapes of the lesions contained in the areas of interest, or an approximated spherical or ellipsoidal shape, from a calculation of moments of the order 0 or the order 1. The closed contours of each active lesion and their location relative to the second image are then addressed to the quantification module 60, when, of course, the device comprises one, so that quantification is carried out only from data corresponding to the areas of interest and more particularly to the closed contours contained therein. It is clear that the device according to the invention can function without the calculation module 40 and detection module 50. In fact, the main object of the detection of the areas of interest is to avoid the quantification of the volume variations being carried cut on the entirety of a set of difference data. Thus, quantification is carried out only on one or more parts (or are as of interest) of the sets (second and third) of image data. This makes it possible to reduce very significantly the processing time for quantification, without thereby reducing the quality and the accuracy of the results obtained. Similarly, in the absence of the calculation module 40 and detection module 50 or of the segmentation module 70, the areas of interest may be obtained by the quantification module 60 from the second image. In order to do this, for each voxel of the second image, qantification is carried out by means of a sphere of a given radius centered on the said voxel, then the volume variation value thus measured (image datum) is attributed to the corresponding voxel of a new image.

The device according to the invention may be installed in a memory, for example a mass memory of a work station, in the form of software.

For information, it is stated that more detailed descriptive elements were filed on the Feb. 11th 1997, under confidential cover, at the Société des Gens de Lettres, under reference No. 1997.02.0216/0216. This document, entitled "Deformation analysis to detect and quantify active lesions in 3D medical image sequences", Search Report No. 3101 of INRIA, February 1997, authors Jean-Phillipe Thirion and Guillaume Calmon, will be mad public after the present Patent Application has been filed The invention is not limited to t e embodiment described above, but encompasses all the variants which a person skilled in the art may develop within the framework of the claims which follow.

Thus, the processing of two medical images obtained at different moments has been described above. But the processing may equally apply to images in another field, such as, for example, that of high precision welding. Moreover, the processing may also be carried out starting from a first image and from its image symmetrized with respect to a plane, when the firs image is sufficiently symmetrical for this to be done.

Moreover, a device has been described comprising both calculation and detection means and quantification means. But it is clear that a device according to the invention may comprise only calculation means (application of one or more operators), or only calculation means and detection means, or even only quantification means.

Finally, a device has been described in which the processing means calculate a deformation vector field from the second and third sets of image data in such a manner as to determine a set of difference data. But it is clear that another vector field, different from a deformation field, could be calculated.

What is claimed is:

1. An electronic image processing device, comprising
    means for receiving a first set of image data representing a first digital image and a second set of image data representing a second digital image, the second digital image being comparable to the first digital image;
    means for determining a registration transformation between the first image and the second image, using the received first and second sets of image data;
    means for resampling the first set of image data to form a third set of image data relating to the first image, using the determined registration transformation; and
    processing means, processing the second and third sets of image data, to superpose directly, sample-by-sample, the third set of image date on the
    second set of image data, select superposable areas of interest of the images constituted, respectively,
    by the second and third sets of image data, determine a deformation vector field from the images constituted by the
    second and third sets of image data, at least in the superposable areas of interest, and
    compute from the vector field at least one set of differential data representing volumetric differences between the superposable areas of interest.

2. Device according to claim 1, characterized in that the processing means (30) comprise first calculation means (40) capable of applying to the said deformation vector field at least a first operator in order to provide a set of difference data termed a first set of difference data.

3. Device according to claim 2, characterized in that the processing means (30) comprise second calculating means (40) capable of applying to the said deformation vector field a second operator, different from the first operator, in order to provide another set of difference data termed a second set of difference data.

4. Device according to claim 3, characterized in that the processing means (30) comprise third calculating means (40) capable of applying to the said deformation vector field a third operator, a composition of the first and second operators, in order to provide another set of difference data termed a third set of difference data.

5. Device according to one of claim 2, characterized in that the first operator is selected from a group comprising an operator of the modulus type and an operator based on partial derivatives.

6. Device according to claim 5, characterized in that the second operator is selected from the said group comprising an operator of the modulus type and an operator based on partial derivatives.

7. Device according to either of claim 5, characterized in that the operator based on partial derivatives is of the divergence type.

8. Device according to either of claims 5, characterized in that the operator based on partial derivatives is of the Jacobian type.

9. Device according to one of claim 2, characterized in that the processing means (30) comprise detection means (50) capable of transforming the first, second and third sets of difference data into a fourth set of image data forming a card.

10. Device according to claim 9, characterized in that the detection means (50) are arranged to permit manual selection by a user, from the said card, of the areas of interest.

11. Device according to claim 9, characterized in that,the detection means (50) are arranged to carry out automatic selection of the areas of interest in the said card.

12. Device according to claim 11, characterized in that selection is carried out by analysis of the connex elements type.

13. Device according to one of claim 9, characterized in that the detection means (50) are capable of determining for each selected area of interest a closed contour which delimits it.

14. Device according to claim 13, characterized in that the detection means (50) are capable of attributing a spherical shape to the closed contours of the selected areas of interest.

15. Device according to claim 13, characterized in that the detection means (50) are capable of attributing an ellipsoidal form to the closed contours of the selected areas of interest.

16. Device according to one of claim 1, characterized in that the processing means (30) comprise quantification, means (60) capable of determining, starting from the deformation vector field and the second and third sets of image data, volume data representing differences of the volume variation type, so as to form the said set of difference data, which is then termed a set of volume data.

17. Device according to claim 16, characterized in that the quantification means (60) are arranged to:
    associate with a closed contour, representing an area of interest, a reference contour encompassing the said closed contour,
    breaking down into elements, by means of a points distribution, the space contained in the said reference contour, counting the elements contained within the closed contour of the area of interest, applying to the said points distribution the deformation vector field, without deforming the said closed contour of the area of interest, counting the remaining elements within the closed contour of the area of interest, and carrying out subtraction between the two numbers of elements so as to determine the volume data of the set of volume data which represent volume variations of the area of interest.

18. Device according to claim 17, characterized in that the quantification means (60) are arranged to attribute a spherical shape to the reference contours of the areas of interest.

19. Device according to claim 18, characterized in that the quantification means (60) are arranged to attribute an ellipsoidal shape to the reference contours of the areas of interest.

20. Device according to one of claim 17, characterized in that the quantification means (60) are arranged to calculate, in each area of interest, a multiplicity of volume variations for reference contours, closed and nested in one another, and comprised between a contour comparable with a point of zero dimension and the selected reference contour, and to determine, from the said multiplicity of volume variations, a volume variation value which is the most probable for each area of interest.

21. Device according to one of claims 17, characterized in that the quantification means (60) are arranged to break down the space by means of a regular points distribution, forming a lattice.

22. Device according to one of claim 17, characterized in that-the quantification means (60) are arranged to break down the space stochastically by means of a random points distribution.

23. Device according to claim 17, characterized in that the quantification means operate on closed contours determined by the said detection means in the selected areas of interest.

24. Device according to one of claim to 16, characterized in that it comprises segmentation means (70) capable of supplying the said areas of interest to the said quantification module from the second set of image data.

25. Device according to claim 1 characterized in that the comparable digital images are medical images.

26. Device according to claim 25, characterized in that the comparable digital images are three-dimensional medical images of regions of the brain of a living being.

27. Device according to claim 1 characterized in that the areas of interest are active anatomical structures.

28. Device according to claim 1, characterized in that the areas of interest are active lesions.

29. Device according to claim 1 characterized in that the second image is an image deduced from the first image by symmetry with respect to a plane.

30. A method for processing two gets of image data representing, respectively, two comparable digital images, said method comprising:

receiving a first set of image data representing a first digital image and a second set of image data representing a second digital image, the second digital image being comparable to the first digital image;

determining a registration transformation between the first image and the second image, using the received first and second sets of image data;

resampling the first set of image data to form a third set of image data relating to the first image, using the determined registration transformation;

superposing directly, sample-by-sample, the third set of image date on the second set of image data;

selecting superposable areas of interest of the images constituted, respectively, by the second and third sets of image data;

determining a deformation vector field from the images constituted by the second and third sets of image data, at least in the superposable areas of interest; and computing from the vector field at least one set of differential data representing volumetric differences between the superposable areas of interest.

* * * * *